US006985867B1

(12) United States Patent
Pryor et al.

(10) Patent No.: US 6,985,867 B1
(45) Date of Patent: Jan. 10, 2006

(54) METHOD OF PREDICTING A CHANGE IN AN ECONOMY

(75) Inventors: Richard J Pryor, Albuquerque, NM (US); Nipa Basu, Albany, NY (US)

(73) Assignee: Sandia Corporation, Albuquerque, NM (US)

( * ) Notice: Subject to any disclaimer, the term of this patent is extended or adjusted under 35 U.S.C. 154(b) by 973 days.

(21) Appl. No.: 08/791,724

(22) Filed: Jan. 29, 1997

(51) Int. Cl.
*G06F 17/60* (2006.01)

(52) U.S. Cl. .............................................. 705/1; 703/6
(58) Field of Classification Search .................... 705/1, 705/10, 35, 36, 7; 395/200.3, 200.34, 200.36, 395/200.37, 925; 709/201, 202, 204, 205, 709/206, 207; 703/6
See application file for complete search history.

(56) References Cited

U.S. PATENT DOCUMENTS

| | | | | |
|---|---|---|---|---|
| 5,406,477 A | * | 4/1995 | Harhen ........................... | 703/6 |
| 5,444,819 A | * | 8/1995 | Negishi .......................... | 705/7 |
| 5,486,995 A | * | 1/1996 | Krist et al. .................... | 700/29 |
| 5,652,717 A | * | 7/1997 | Miller et al. ................... | 703/6 |
| 5,689,650 A | * | 11/1997 | McClelland et al. ........... | 705/36 |
| 5,737,581 A | * | 4/1998 | Keane ........................... | 703/6 |
| 5,774,878 A | * | 6/1998 | Marshall ....................... | 705/35 |
| 5,812,988 A | * | 9/1998 | Sandretto ...................... | 705/36 |
| 5,818,737 A | * | 10/1998 | Orr et al. ....................... | 703/6 |
| 5,884,283 A | * | 3/1999 | Manos .......................... | 705/30 |
| 5,946,667 A | * | 8/1999 | Tull et al. ...................... | 705/36 |
| 6,212,649 B1 | * | 4/2001 | Yalowitz et al. ........ | 709/201 R |

FOREIGN PATENT DOCUMENTS

| | | | |
|---|---|---|---|
| DE | 3830326 A1 | * | 3/1990 |
| JP | 08314892 A | * | 11/1996 |
| WO | WO9744741 | * | 11/1997 |

OTHER PUBLICATIONS

Leijonhufvud, Axel, "Towards a Not-Too-Rational Macroeconomics", Southern Economic Journal v. 60 n. 1 p1(13), Jul. 1993.*
Jurik, Mark "Trading Techniques: The Care and Feeding of a Neural Network", Futures: The Magazine of Commodities and Options v. 21 n. 12 p. 40-44, Oct. 1992.*
Coats, Pamela K, "Will Economic System Work for Economic Forecasting?" Journal of Business Forecasting v. 6 n. 1 p. 23-27, 1987.*
Pryor et al., "Development of Aspen: A Microanalytic Simulation Model of the US Economy" Report Number SAND-96-0434, Feb. 1996 (abstract).*
Bull et al., "Monetry Implications of Tax Reforms", National Tax Journal, Sep. 1996, v. 49, n.3, pp. 359-379.*
Basu et al., "Aspen: A Microsimulation Model of the Economy" Sandia Report SAND96-2459, Oct. 1996.*
Goonatilake et al, "Intelligent Systems for Finance and Business", 1995, John Wiley and Sons, chapters 14-16, pp 251-311.*
Pindyck et al, "Microeconomics", 1989, Macmillan Publishing Company, pp 649-657.*

(Continued)

*Primary Examiner*—James W. Myhre (57) ABSTRACT

An economy whose activity is to be predicted comprises a plurality of decision makers. Decision makers include, for example, households, government, industry, and banks. The decision makers are represented by agents, where an agent can represent one or more decision makers. Each agent has decision rules that determine the agent's actions. Each agent can affect the economy by affecting variable conditions characteristic of the economy or the internal state of other agents. Agents can communicate actions through messages. On a multiprocessor computer, the agents can be assigned to processing elements.

16 Claims, 3 Drawing Sheets

OTHER PUBLICATIONS

Guy Orcutt, Steven Caldwell, and Richard Wertheimer II, 1976. *Policy Exploration through Microanalytic Simulation*, Chapter 1, pp. 1-12. Washington, D.C.: Urban Institute.

Robert L. Bennett and Barbara R. Bergmann, *A Microsimulated Transactions Model of the United States Economy*, Chapter 1, pp. 1-11. The John Hopkins University Press 1986.

* cited by examiner

METHOD OF PREDICTING A CHANGE IN AN ECONOMY

This invention was made with Government support under Contract DE-AC04-94AL85000 awarded by the U.S. Department of Energy. The Government has certain rights in the invention.

BACKGROUND OF THE INVENTION

This invention relates to the field of prediction of changes in economies at the microeconomic level.

The most common tools currently used for economic modeling are either macroeconomic or computable general equilibrium (CGE). Macroeceonomic models use complex multivariate regression analysis on aggregate data to represent the economy as a sequence of linear equations. CGE models require the solution of systems of simultaneous equilibrium equations to obtain a forecast. The economics profession has devoted more than six decades to devising and improving these economic models. In particular, econometric techniques of parameter specification have reached a high degree of sophistication. Hence, the macromodels can provide accurate forecasts. Problems arise, however, when totally new economic policies are introduced, where no past relevant data is available to develop the modeling parameters.

Microanalytic simulation models have potential to overcome these problems. Present microanalytic models, however, can not compete with the macromodels in terms of forecast accuracy. Two microanalytic models have been tried: the Urban Institute model, originally developed by Orcutt, and the Transaction model, developed by Barbara Bergmann. The Urban Institute model uses macroestimation to derive non-household sectors and incorporates those sectors through feedback loops. See, e.g., Policy Exploration through Microanalytic Simulation, Orcutt, Caldwell, and Wertheimer, Urban Institute, Wash. D.C. 1976. The Transaction model is a nonstochastic, semi-macro model. Neither of the two are competitive with macromodels in accuracy. See, e.g., A Microsimulated Transactions Model of the United States Economy, Bennett and Bergmann, Johns Hopkins University Press 1986.

There is a need for a microsimulation model that takes advantage of increasing computing capacity, advances in evolutionary learning models, and microeconomic data to accurately predict changes in complex economies without a need for modeling parameters based on past macroeconomic data.

SUMMARY OF THE INVENTION

The present invention provides a method for predicting changes in an economy, using a microsimulation model. The economy to be microsimulated comprises a plurality of decision makers. Decision makers include, for example, households, government, industry, and banks. The decision makers are represented by agents, where an agent can represent one or more decision makers. Each agent has decision rules that determine the agent's actions. Each agent can affect the economy by affecting variable conditions characteristic of the economy or the internal state of other agents. Agents can communicate actions through messages. On a multiprocessor computer, the agents can be assigned to processing elements.

Agents can represent household decision makers. Such agents can have internal state representing saved funds balances. They can have decision rules determining whether to purchase product from other agents, whether to borrow funds from other agents, and whether to save additional funds.

Agents can also represent industry decision makers. Such agents can have internal state representing the number of employees working at the industry agent and the capital assets of the industry agent. They can pay wages to agents representing the employees. The industry agent can have decision rules for determining whether to change the number of employees working at the firm, whether to purchase additional capital assets, whether to borrow funds from other agents, and what price to charge for its product. The quantity of product produced can be a function of the number of employees and the capital assets.

Agents can also represent bank and government decision makers. Such agents can have decision rules for determining whether to lend or borrow money, and the interest rate associated with lending or borrowing. An agent representing a government decision maker can collect taxes from wages paid by industry agents, and can pay unemployment funds to agents representing unemployed workers.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

The present invention provides a method for using a computer to predict activity in an economy.

Figure 1:
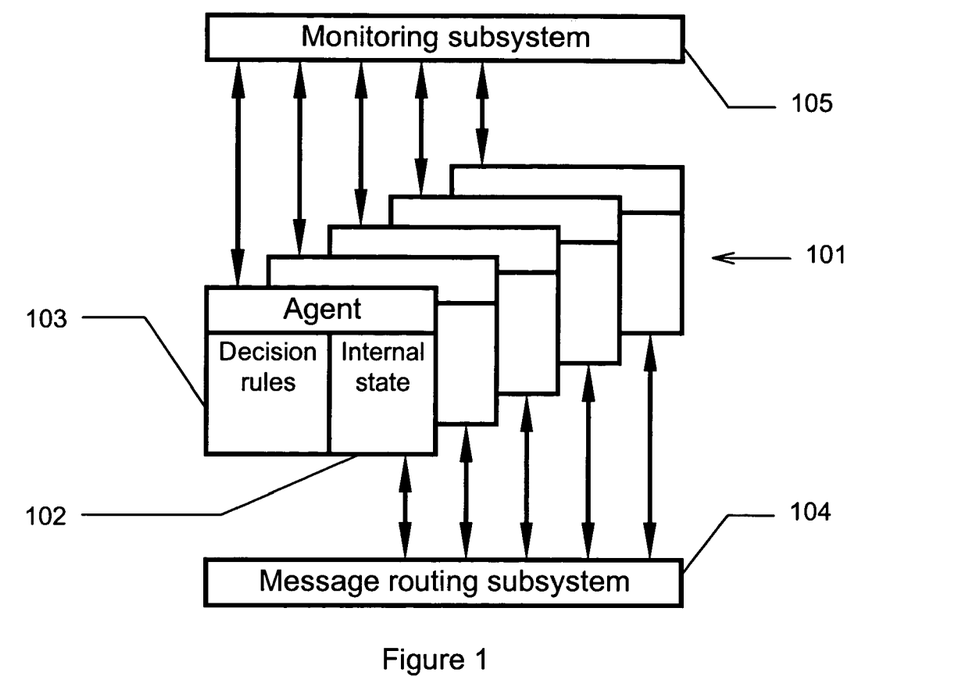
FIG. 1 illustrates the organization and information flow of a representation of an economy according to the present invention.

FIG. 1 illustrates the organization and information flow of a representation of an economy according to the present invention. The economy comprises a plurality of decision makers (e.g., households, industrial firms, financial and government entities). The decision makers are represented by agents 101. Each agent 101 can represent one decision maker or an aggregate of a plurality of decision makers. Agents 101 comprise internal state 102 and decision rules 103. Internal state 102 can represent household bank balances or industrial firm inventory, for example. Decision rules 103 define actions the agent 101 will take responsive to messages from other agents and considering its internal state 102. Messages from originating agents are routed to destination agents by message routing subsystem 104. Information describing activity of the economy is collected by monitoring subsystem 105. Monitoring subsystem 105 can collect information needed to output a representation of a change in the economy, including information from the agents' internal states (e.g., household income and industrial firm profitability), information from the messages communicated between agents (e.g., demand for certain products), and information about economic variables of the economy (e.g., unemployment and money supply).

Figure 2:
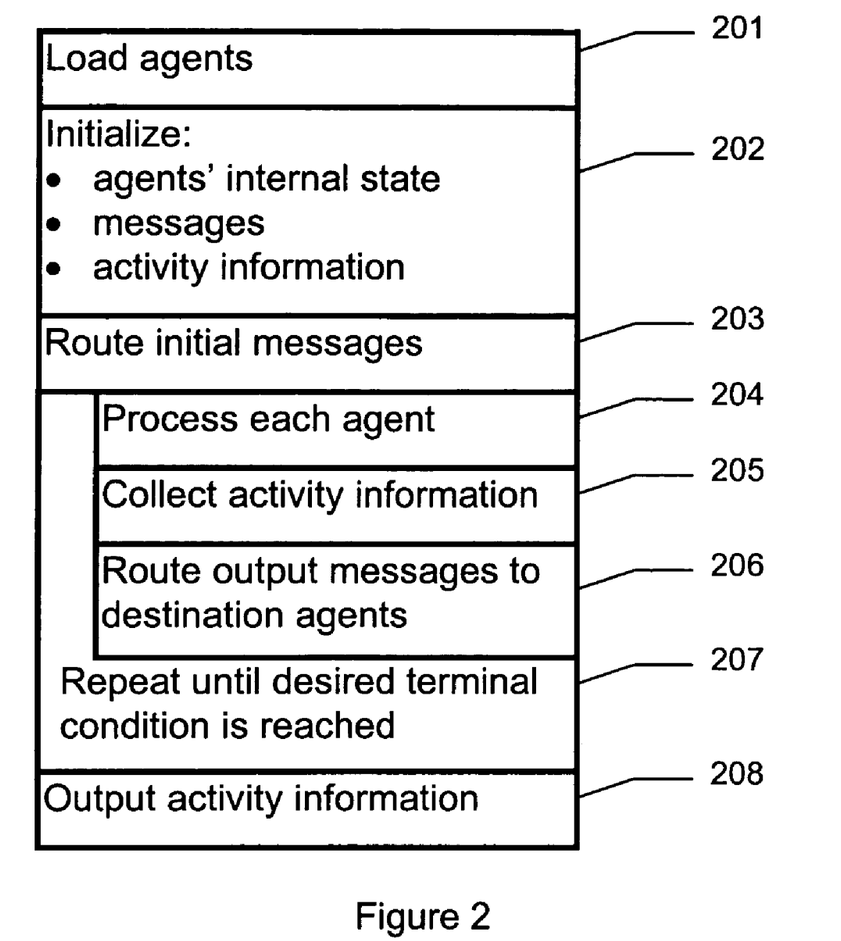
FIG. 2 is a flow diagram of computer operation according to the present invention.

FIG. 2 is a flow diagram of computer operation according to the present invention. Software defining agents is loaded 201 into storage accessible to a computer processor. The computer processor performs any required initialization 202. For example, agents' internal state can be initialized (account balances, etc.), start-up messages can be routed to agents, and activity counters can be initialized. Any initial messages are routed to the agents 203. The agents are then processed 204, where processing comprises applying each agent's decision rules based on incoming decision messages and the agent's internal state (discussed more fully below). Information needed to report the activity of the economy is then collected 205. This information can represent the agent's internal state (e.g., bank balance, family size), messages communicated by the agent (e.g., requests for loans, employment offers), or information pertinent to the economy as a whole (e.g., prevailing interest rates). Messages are routed from agents to the messages' destination agents 206. Steps 204, 205, and 206 are repeated until a desired terminal condition is reached 207. For example, the processing can terminate after a certain number of cycles, or when the economic activity has selected characteristics. The collected activity information can then be displayed 208 as a representation of the changes in the economy.

Figure 3:
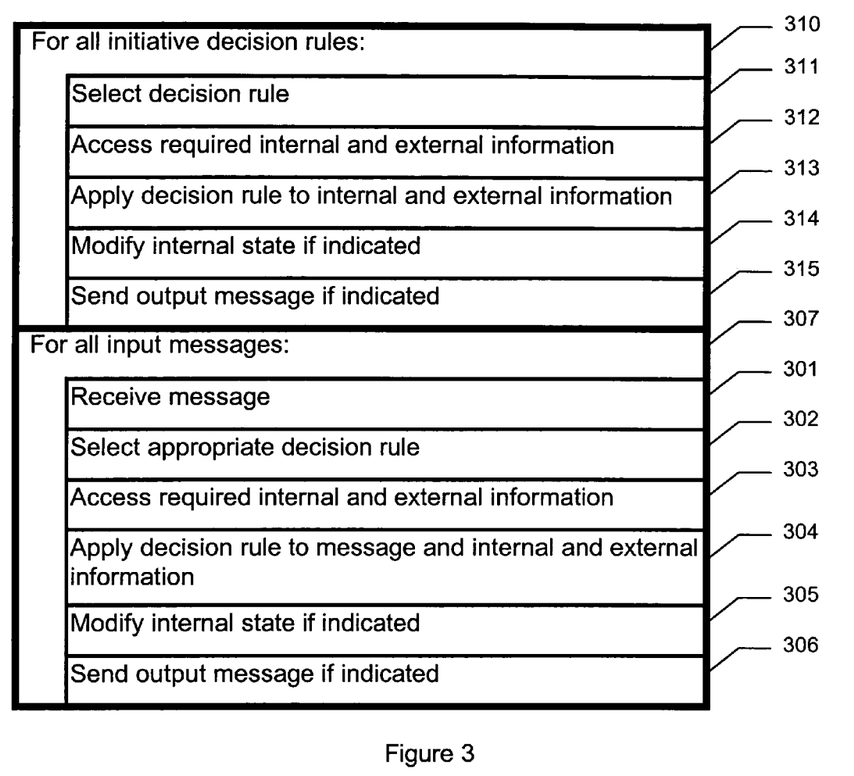
FIG. 3 shows the sequence of steps for processing an agent according to the present invention.

FIG. 3 shows the sequence of steps for processing an agent. Initialization, statistical reporting, and other functions (not shown) can be implemented in response to messages or can be realized with direct access to the agent's internal state. Example decision rules for particular types of agents are discussed after the discussion of the overall process.

Agents can have decision rules that initiate action. Each 310 such initiative decision rule is selected 311. Information needed by the decision rule is accessed 312 from the agent's internal state (e.g., bank balances) and from external sources (e.g., dates). The decision rule is then applied 313 to the information accessed. The internal state is then modified 314 if indicated by the decision rule. Output messages can be sent 315 if indicated by the decision rule.

Agents also respond to messages from other agents. Each 307 message waiting for this agent is received by the agent 301. Receiving a message can involve removing the message information from a logical or physical data structure. The appropriate decision rule is then selected 302. The content of the message includes information that indicates which of the agent's decision rules will determine the agent's response to the message. Information needed by the decision rule to determine the agent's response is then accessed 303 from the agent's internal state (e.g., bank balances) and from external sources (e.g., dates). The decision rule is then applied 304 to the information in the received message and the information accessed from the agent's internal state. If the decision rule indicates changes to the internal state (e.g., withdrawal from a bank balance) then the agent's internal state is modified 305. If the decision rule indicates output messages to send (e.g., accept a loan application) then appropriate messages are sent 306. The processing of the agent is complete once all the messages have been received and acted upon and all the decision rules that operate independently of messages have been applied.

The sequence of steps shown in FIG. 3 can be accomplished using well known general purpose computers. Economies with large numbers of agents or complex decision rules can require significant computer performance. Multiprocessor computers can be programmed to accomplish the steps. For large numbers of agents, subsets of the agents can be assigned to each of the processors in a multiprocessor computer. The processors can then process their assigned agents in parallel, reducing the overall time needed to accomplish the steps.

Messages

Messages between agents can be routed by content (e.g., a message can be sent to "any bank") or by specific address (e.g., a message can be sent to "industrial firm F23"). The message routing operation can use the destination information of the message to route message in the most economical manner. For example, agents can be assigned to processors in a multiprocessor. Each processor can communicate messages between agents assigned thereto without using interprocessor communication resources. Only those messages that are between agents assigned to different processors need to incur the cost of using interprocessor communication resources.

Some actions can be accomplished with a single message. For example, an industry agent can pay tax by deducting the amount from the agent's funds account (in its internal state) and sending a message to a government agent indicating that the industry agent is paying taxes of a certain amount.

Other actions can require that a series of messages be passed. For example, if a household agent's decision rules indicate that the agent wants to buy a new home, the household agent must calculate how much money it wants to borrow and send a borrow request message to a bank agent requesting a loan. The bank agent must read the borrow request message and decide whether to grant to the loan. If the bank agent's decision rules result in rejection of the loan request, then the bank agent sends a rejection message to the household agent and the household agent either gives up or tries another bank agent. If the bank agent's decision rules result in acceptance of the loan request, then the bank agent sends an acceptance message to the household agent. The household agent must then decide which housing developer agent to buy the house from and send an appropriate message to that agent.

Agents

There can be many types of agents in an economy. Some types of decision makers can be represented by many agents. Examples include households, banks, housing developers, and industrial producers. Other types of decision makers can be represented by a single agent. Examples include the government, the monetary policy maker (in the U.S., the Federal Reserve Board), a capital goods producer, and a financial market. The invention is not limited to a particular mix of single agent representation or multiple agent representation; the example given illustrates one method of representing decision makers.

Each agent can be microsimulated by decision rules that cause the agent to behave similarly to the decision maker represented by the agent. For example, household agents can have decision rules that determine where and whether to buy food, borrow money to buy a house, and buy a car.

An agent can have internal state that affects the agent's actions. For example, a household agent's actions can depends on family size, current income, and savings account balance. Some of these values can be initialized. A constant value can be used for the initial values, or the initial values can be set to conform to a distribution. For example, savings account balances can be initialized to conform to an exponential distribution around a selected mean amount.

Household Agents

Household agents can generate most of their income through employment. Employers can be industry agents, government agents, bank agents, or other employer agents. The household agent obtains a job by sending an accept message in response to a job offer message. The employing agent pays the household agent a salary until the household agent quits or is fired. When a household agent is unemployed, a government agent can pay a welfare payment to the household agent. Household agents can also generate income from interest on bonds and savings accounts and shares of industry agents' profits. A household agent can pay a tax on income or property.

A household agent can consume various types of goods. Demand for each type of good can be simulated. For example, decision rules simulating demand for food can be based on family size. When the demand has been determined the household agent's decision rules can select an industry agent that produces food. The decision rules can compare prices from food producing agents. The selection can be strictly on price, strictly random, or some probabilistic function including food price. Demand for other goods can be determined similarly.

Household agents can also purchase durable goods. For example, a household agent's decision rules can indicate no transportation demand as long as the household agent's car is working. The household agent's decision rules can indicate a break down of the car, however, with some random or probabilistic frequency. When the car breaks down, the decision rule can cause the household agent to try to purchase a new car. The decision rule can identify a suitable car producing industry agent by using a similar price-based decision as desired for food purchases. With sufficient savings, the household agent's decision rules can cause the household agent to pay cash for the new car. Otherwise, the household agent's decision rules can initiate an application for a loan from a bank agent. The decision rules can select a bank agent based on lowest interest rate or by some other random or probabilistic process. The bank agent's decision rules can base the amount of the loan granted on the current income of the household agent. The quality of car purchased, and hence probability of future breakdowns, can be based on the purchase price.

Household agents can also purchase housing. Household agents can rent housing by paying a percentage of income to another agent as rent. A household agent's decision rules can decide to buy a house based on random or probabilistic functions considering the household agent's current state and various conditions on the economy (e.g., mortgage interest rates). The household agent's decision rules can select a bank agent to apply for a loan from and a developer agent to purchase the house from based on prices the bank agent and developer agents charge for their services.

Household agents' decision rules can also allocate income to increased savings account balances and to investments (for example bonds issued by the government or by other agents).

Industry Agents

Industry agents can use capital and labor to produce goods. The production of goods can be a function of the number of employees and the agent's capital assets. Different goods can be produced at rates governed by different functions of employees and capital assets. An industry agent's decision rules can vary production by hiring and firing employees and by buying or selling capital assets. Decisions to hire or fire employees and to buy or sell capital assets can be made based on average demand for the industry agent's products and the industry agent's inventory. Industry agents can also borrow money to buy capital assets. Wages can vary based on goods produced, and can vary based on individual employee productivity if the industry agent includes internal state to simulate different employee productivity levels.

Industry agents can set prices for their products based on demand and inventory. For example, an industry agent's decision rules can determine whether product price has been increasing or decreasing, whether profits have been increasing or decreasing, whether sales have been increasing or decreasing, and whether its prices are higher or lower than other industry agents producing similar products. The industry agent's decision rules can then set its prices based on those determinations. Pricing decisions can also be randomized within certain probabilities based on the determinations. Industry agents' decision rules can also adjust the probabilities based on previous pricing decisions. For example, raising prices when prices are higher than other industry agents and sales are decreasing can result in lower profits; the industry agent's decision rules can make the probability of increasing its price in such circumstances very low. A more detailed description of this learning process is given below.

Industry agents can also pay taxes on its profits on its payroll. Industry agents' decision rules can indicate whether to retain, invest, or distribute profits. Retained profits can cover later losses or can allow future purchases of capital assets. Distributed profits can go to household agents owning the industry agent, to households of employee agents, or to all household agents in the economy.

Bank Agents

Bank agents can maintain savings accounts for household agents, buy and sell government and industry bonds, make loans, and hire employees. A bank agent pays taxes and wages like an industry agent. A bank agent's decision rules can decide whether to grant loans based on the applicant agent's income, the applicant agent's default history, the bank agent's default rate, and the amount of the loan. Like with industry agents' pricing decisions, bank agents' decision rules can adjust loan decisions and interest rates based on learning from previous decisions.

Government Agents

Government agents can represent governmental actions in an economy. For example, a government agent can collect taxes (income, sales, payroll), pay welfare payments to retired and unemployed household agents, issue and pay dividends on bonds, and employ a number of household agents.

Other Agents

Agents can also model the actions of other actors in an economy. For example, stock and financial markets can be represented by agents with appropriate decision rules. A central monetary policy-maker, like the Federal Reserve, can be modeled with an agent.

Other, non-monetary economies can be modeled according to the present invention. For example, military confrontations can be modeled by a number of agents. Agents could represent various military capabilities, and each agent's decision rules could implement chosen campaign strategies. Messages among agents could simulate battlefield communications.

Agent Learning

Decision makers in a real economy can learn, adjusting current decisions based on results from previous decisions. Learning can be simulated according to the present invention by allowing agents to modify their own decision rules.

Any type of agent can learn; the description below illustrates the process using an industry agent's price setting rules as an example.

An industry agent can determine four trends daily: whether product price has recently been increasing or decreasing, whether sales have recently been increasing or decreasing, whether profits have recently been increasing or decreasing, and whether prices are higher or lower than the industry average. Since each of those four trends represents a binary determination (i.e., either yes or no), the combination of trends results in sixteen states for the industry agent.

A probability vector (Pd, Pi, Pc) can be assigned to each state, where Pd represents the probability the industry agent will decrease a given price the next time the industry agent enters the state, Pi represents the probability the industry agent will increase the price, and Pc represents the probability the industry agent will keep the price constant. Upon entering a certain state, the industry agent's decision rules choose a random number and combines that with the probability vector to decide how to adjust the price. The industry agent's decision rules then adjust the probability vector according to how the price change affects profits.

For example, suppose that at a particular time the probability vector for a state is (0.1, 0.6, 0.3). Suppose an industry agent enters this state and draws a random number that indicates a need for a price increase. Suppose further that profits decrease over a selected time interval following the price increase. The agent can adjust the probability vector (e.g., to (0.15, 0.5, 0.35)) to reflect the decrease in profits by making it less likely that the industry agent's decision rules will increase prices when in that state. The industry agent thereby changes future actions by learning that price increases in the state are detrimental to profits.

The changes to the probability vectors can reflect various learning modes. For example, the magnitude of the change to the vector can be constant, or can be related to the magnitude of the change in profits. Probabilities too close to zero can prevent firms from learning if conditions change, so the probabilities can be prevented from decreasing below a certain value, or can be randomly perturbed.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method of predicting a change in an economy, practiced on a computer, where the economy comprises a plurality of decision makers and economic variables having initial values, said method comprising the steps of:
   a) representing the decision makers by a plurality of agents, where each agent comprises internal state and decision rules defining the agent's actions responsive to input messages and the internal state;
   b) initializing the internal state of each agent;
   c) processing each agent, where processing an agent comprises the steps of:
      i) receiving an input message destined for the agent, if one exists;
      ii) generating output messages and changes to the agent's internal state based on the input message, the agent's internal state, and the agent's decision rules, where an output message comprises information identifying an indicated destination agent;
      iii) repeating steps i) and ii) until there are no more input messages destined for the agent;
   d) routing output messages from each agent to indicated destination agents;
   e) determining new values for the economic variables from the agents' internal states and the output messages;
   f) repeating steps c, d, and e until a terminal condition is reached; and
   g) outputting a representation of the change in the economy based on the initial values of the economic variables and the new values of the economic variables.

2. A method of predicting a change in an economy, practiced on a computer comprising a plurality of processors, where the economy comprises a plurality of decision makers and economic variables having initial values, said method comprising the steps of:
   a) representing the decision makers by a plurality of agents, where each agent comprises internal state and decision rules defining the agent's actions responsive to input messages and the internal state;
   b) initializing the internal state of each agent;
   c) processing each agent, where processing an agent comprises the steps of:
      i) receiving an input message destined for the agent, if one exists;
      ii) generating output messages and changes to the agent's internal state based on the input message, the agent's internal state, and the agent's decision rules, where an output message comprises information identifying an indicated destination agent;
      iii) repeating steps i) and ii) until there are no more input messages destined for the agent;
   d) routing output messages from each agent to indicated destination agents;
   e) determining new values for the economic variables from the agents' internal states and the output messages;
   f) repeating steps c, d, and e until a terminal condition is reached;
   g) outputting a representation of the change in the economy based on the initial values of the economic variables and the new values of the economic variables; and
   h) assigning each processor a subset of the agents, where each processor processes the agents assigned thereto.

3. The method of claim 2, additionally comprising the step of modifying the agent's decision rules during the processing of the agent.

4. The method of claim 3, wherein the step of modifying the agent's decision rules during the processing thereof comprises the steps of:
   a) generating a probability vector comprising probabilities the agent will choose among a plurality of selected actions;
   b) causing the agent to take a certain selected action based on the probability vector;
   c) determining if the economic results following the certain action were favorable or unfavorable; and
   d) adjusting the probabilities in the probability vector to increase the probability that the agent will take actions that have been followed by favorable economic results and to decrease the probability that the agent will take actions that have been followed by unfavorable economic results.

5. The method of claim 3, wherein the plurality of decision makers comprises a plurality of household decision makers, wherein each agent representing a household decision maker has internal state representing a saved funds balance, and where each agent representing a household decision maker has decision rules for determining whether to buy product from another agent and whether to borrow funds from another agent.

6. The method of claim 3, wherein the plurality of decision makers comprises a plurality of industry decision makers, wherein each agent representing an industry decision maker has internal state representing a number of employees working at the agent and an amount of capital assets of the agent, and where each agent representing an industry decision maker has decision rules for determining whether change the number of employees working at the agent, whether to borrow funds from another agent, and what price to charge for the agent's product.

7. The method of claim 3, wherein the plurality of decision makers further comprises a bank decision maker, and wherein each agent representing a bank decision maker can make loans to other agents and can accept deposits from other agents, and has decision rules for determining a first interest rate to charge on loans and a second interest rate to pay on deposits.

8. The method of claim 3, further comprising the step of modifying at least one agent's decision rules as the agent is processed.

9. The method of claim 3, wherein the plurality of decision makers comprises a plurality of household decision makers, a plurality of industry decision makers, and a government decision maker.

10. The method of claim 9, wherein each agent representing a household decision maker has internal state representing a saved funds balance, and wherein each agent representing a household decision maker has decision rules for determining whether to purchase product from an agent representing an industry decision maker and which agent representing an industry maker to purchase product from.

11. The method of claim 9, wherein each agent representing an industry decision maker has internal state representing a number of employees working at the agent and the capital assets of the agent, and wherein each agent representing an industry decision maker has decision rules for determining whether to hire or fire employees and for determining whether to purchase or sell capital assets and for determining a price for the agent's product.

12. The method of claim 9, wherein the plurality of decision makers comprises a bank decision maker, and wherein each agent representing a bank decision maker can make loans to other agents and can accept deposits from other agents, and has decision rules for determining a first interest rate to charge on loans and a second interest rate to pay on deposits.

13. The method of claim 2, wherein the computer additionally comprises an interprocessor communication facility, and wherein the step of routing output messages comprises, on each processor, the steps of:
 a) collecting the output messages from all the agents assigned to the processor;
 b) separating the collected output messages into a first group comprising output messages destined for agents assigned to the processor and a second group comprising output messages destined for agents not assigned to the processor;
 c) routing output messages from the first group without using the interprocessor communication facility; and
 d) routing output messages from the second group using the interprocessor communication facility.

14. A method of using a multiprocessor computer to predict a change in an economy, where the economy has a plurality of decision makers, comprising the steps of:
 a) representing the plurality of decision makers by a plurality of agents, where each agent has internal state and decision rules and can accept input messages from other agents and generate output messages for other agents;
 b) assigning each agent to at least one processor in the multiprocessor computer;
 c) establishing initial values for at least part of each agent's internal state;
 d) establishing initial input messages for each agent;
 e) determining a change in the economy by, on each processor, determining new values for the internal state of each agent assigned to the processor and new output messages from each agent assigned to the processor based on the agent's internal state, input messages for the agent and the agent's decision rules;
 f) on each processor, communicating output messages to corresponding agents;
 g) repeating steps e) and f) until a terminal condition is reached; and
 h) outputting a representation of the change in the economy based on the agents' internal states and the output messages.

15. A multiprocessor computer for predicting a change in an economy, where the economy comprises a plurality of decision makers and economic variables having initial values, said multiprocessor computer comprising:
 a) a plurality of processors, where each processor comprises:
  i) intraprocessor message communication facility within each processor;
  ii) interprocessor communication resources accessible from each processor with message routing to the plurality of processors;
  iii) data storage independently accessible from each processor;
  iv) software storage independently accessible from each processor; and
 b) means for controlling the operation of the plurality of processors, comprising:
  i) means for representing the plurality of decision makers by a plurality of agents, where each agent comprises internal state and decision rules;
  ii) means for initializing the internal state of each agent;
  iii) means for inputting the initial values of the economic variables of said economy, where the economic variables are represented as variable conditions;
  iv) means for assigning each agent to at least one processing unit in the plurality of processing units;
  v) means for processing each agent, where processing an agent comprises:
   (1) means for receiving an input message;
   (2) means for updating the internal state of the agent based on the input message, the current internal state of the agent, the decision rules of the agent, and the values of said variable conditions;
   (3) means for generating an output message for a destination agent; and
   (4) means for repeating (1) through (3) until there are no more input messages for the agent;
  vi) means for determining new values for the variable conditions based on a combination of the effects of the plurality of agents;

vii) means for repeating steps v) and vi) until a terminal condition is reached; and viii) means for outputting a prediction of the change in the economy based on a difference of the new values for the variable conditions and the initial values.

16. The apparatus of claim 15, further comprising means for modifying at least one agent's decision rules as the agent is processed.

* * * * *